United States Patent
Lee et al.

(10) Patent No.: US 6,243,132 B1
(45) Date of Patent: Jun. 5, 2001

(54) JITTER CONTROL APPARATUS FOR VIDEO CAMERA

(75) Inventors: Sung-Hee Lee, Suwon; Jae-Ho Moon, Seoul; Duk-Hwan Jang; Gi-Soo Park, both of Suwon, all of (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 08/907,905

(22) Filed: Aug. 11, 1997

(30) Foreign Application Priority Data

Oct. 30, 1996 (KR) .................................................. 96-50505

(51) Int. Cl.$^7$ .................................................. H04N 5/228
(52) U.S. Cl. ........................................... 348/208; 359/554
(58) Field of Search ..................................... 348/208, 207, 348/219, 335, 351, 344, 373, 374, 375, 337, 340; 359/554, 555, 556, 557; 396/52, 55, 421

(56) References Cited

U.S. PATENT DOCUMENTS

| 5,172,268 | * | 12/1992 | Kikuchi | 359/557 |
| 5,280,387 | * | 1/1994 | Maruyama | 359/554 |
| 5,768,016 | * | 6/1998 | Kanbara | 359/557 |

FOREIGN PATENT DOCUMENTS

| 1-140119 | | 6/1989 | (JP) . |
| 1223413 | * | 9/1989 | (JP) . |
| 3-248136 | | 11/1991 | (JP) . |
| 10113247 | * | 5/1998 | (JP) . |

* cited by examiner

Primary Examiner—Wendy R. Garber
Assistant Examiner—Aung S. Moe
(74) Attorney, Agent, or Firm—Burns, Doane, Swecker & Mathis LLP

(57) ABSTRACT

A jitter control apparatus is provided. The apparatus includes a first optical prism installed to be rectilinearly transferable in a right-angled direction with respect to an optical axis for refracting and transmitting incident light so that the angle of emission is smaller than the angle of incidence with respect to the transfer direction, a first actuator for rectilinearly transferring the first optical prism, a second optical prism installed to be adjacent to the first optical prism and rectilinearly transferred in a right-angled direction with respect to the direction in which the first optical prism is transferred for refracting and transmitting the incident light so that the angle of emission is smaller than the angle of incidence with respect to the direction in which the second optical prism is transferred, and a second actuator for rectilinearly transferring the second optical prism, wherein the image formed on the photographing screen is prevented from vibrating by appropriately transferring the first and second optical prisms according to the degree of jitter of the incident image.

3 Claims, 3 Drawing Sheets

JITTER CONTROL APPARATUS FOR VIDEO CAMERA

BACKGROUND OF THE INVENTION

The present invention relates to a jitter control apparatus for a video camera, and more particularly, to a jitter control apparatus for a video camera for preventing jitter of the screen caused by vibrations of the hands of the user.

It is difficult to videotape with recently developed home video cameras designed to be hand held without a support such as a tripod since there are jitters on the screen due to vibrations of the hands of the user.

To account for such a problem, a conventional jitter control apparatus for a video camera includes a variable angle prism respectively shown in FIGS. 1A through 1C. Referring to FIG. 1A, a variable angle prism 10 arranged on a light path is comprised of a pair of glass plates 11 and 13 and a bellows 14. The bellows 14 is formed of a resin such as polyethylene and are fixed so as to connect the frames of the two glass plates 11 and 13. An enclosed inner space is formed between the two glass plates 11 and 13. The bellows 14 can be folded or unfolded by an external force. The inner space between the two glass plates 11 and 13 is filled with a transparent fluid 12 such as silicon oil.

In the operation of the variable angle prism having the above structure, referring to FIG. 1B, when the two glass plates 11 and 13 are parallel, the angle of incidence and the angle of emission of light 16 are the same. However, as shown in FIGS. 1A and 1C, when a predetermined angle is generated between the two glass plates 11 and 13, light 15 and 17, respectively, refracts at a predetermined angle, passing through the two glass plates 11 and 13.

The vibrations of the hands of the user is sensed by a sensor (not shown). The angle between the glass plates 11 and 13 is controlled by driving an actuator (not shown) for driving the glass plates 11 and 13 according to the sensed signal. Therefore, jitters of the screen due to vibrations of the hands can be prevented by differentiating the angle of emission of the light passing through the glass plates 11 and 13 from the angle of incidence.

However, since the apparatus for preventing jitters of a video camera is operated by folding or unfolding the bellows 14, the bellows 14 may break after prolonged use and the liquid 12 between the glass plates 11 and 13 may leak and contaminate the inside of the camera. Also, it is difficult to assemble and manufacture the apparatus.

SUMMARY OF THE INVENTION

It is an object of the present invention to provide a jitter control apparatus for a video camera designed to be assembled and manufactured easily and in which a bellows and oil are not used.

To achieve the above object, there is provided a jitter control apparatus for a video camera according to the present invention, comprising a first optical prism installed to be rectilinearly transferable in a right-angled direction with respect to an optical axis for refracting and transmitting incident light so that the angle of emission is smaller than the angle of incidence with respect to the transfer direction, a first actuator for rectilinearly transferring the first optical prism, a second optical prism installed to be adjacent to the first optical prism and rectilinearly transferred in a right-angled direction with respect to the direction in which the first optical prism is transferred for refracting and transmitting the incident light so that the angle of emission is smaller than the angle of incidence with respect to the direction in which the second optical prism is transferred, and a second actuator for rectilinearly transferring the second optical prism, wherein the image formed on the photographing screen is prevented from vibrating by appropriately transferring the first and second optical prisms according to the degree of jitter of the incident image.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1A:
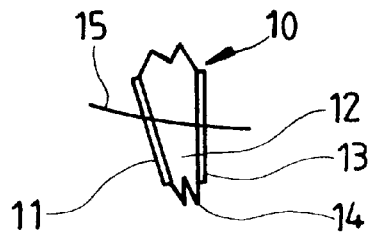
FIGS. 1A through 1C are sectional views showing a conventional jitter control apparatus for a video camera.
Figure 1B:
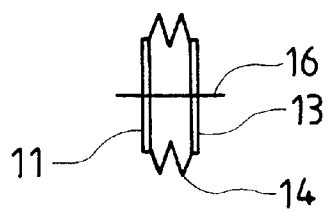
Figure 1C:
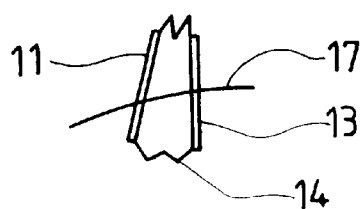
Figure 2:
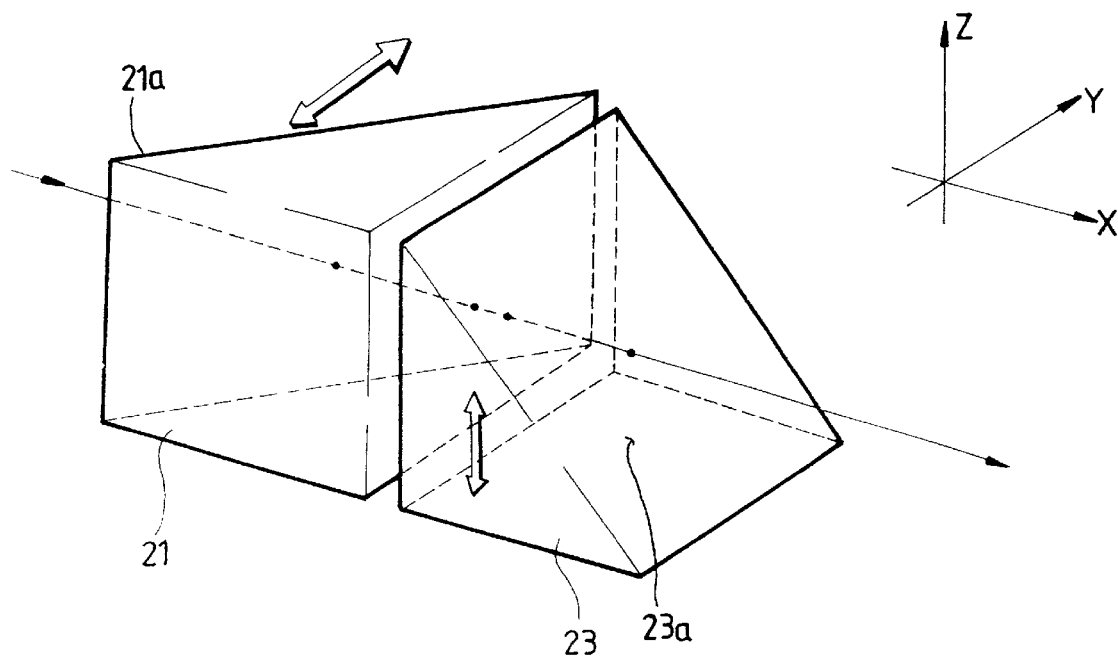
FIG. 2 is a schematic perspective view showing first and second optical prisms included in a jitter control apparatus for a video camera according to an embodiment of the present invention.
Figure 3:
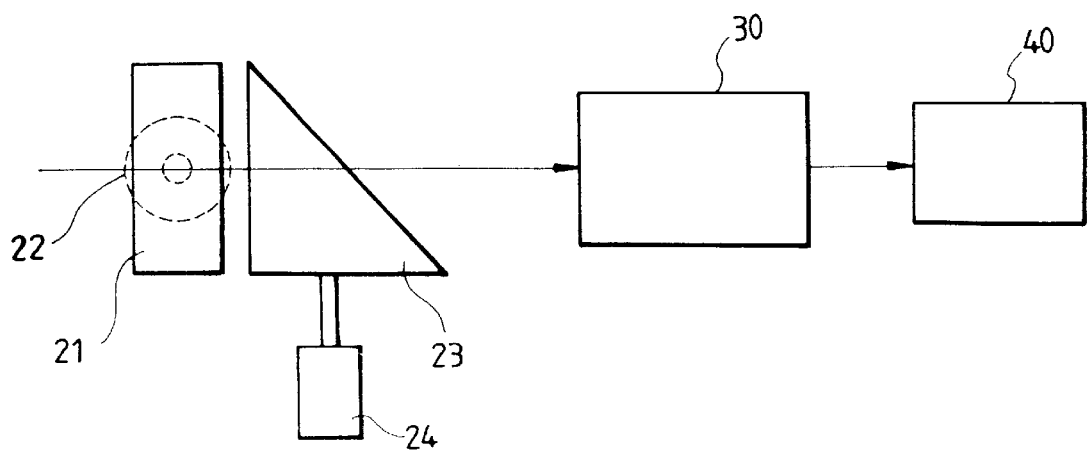
FIG. 3 is a schematic view showing the jitter control apparatus for a video camera according to the embodiment of the present invention.

Referring to FIGS. 2 and 3, the jitter control apparatus for a video camera according to an embodiment of the present invention includes a pair of first and second optical prisms 21 and 23 arranged to be adjacent on the same optical axis as that of a zoom lens unit 30 for controlling the magnification of an image and first and second actuators 22 and 24 for respectively driving the first and second optical prisms 21 and 23. Here, in case the light axis is parallel with the X axis, the first optical prism 21 is linearly transfered along the Y axis by the first actuator 22 and the second optical prism 23 is linearly transfered along the Z axis by the second actuator 24.

The first optical prism 21 compensates for vibrations along the Y axis. Namely, the first optical prism 21 makes the angle of emission smaller than the angle of incidence by refracting the incident light with respect to the Y-axis direction. The first optical prism 21 which is driven by the first actuator 22 is preferably a right-angled triangular prism formed to have a slanted incidence surface 21a so as to alter the width of the image in the Y-axis direction. The first actuator 22 which is preferably a linear stepping motor receives the signal sensed by the sensor (not shown) and linearly transfers the first optical prism 21.

The second optical prism 23 compensates for vibrations along the Z-axis. Namely, the second optical prism makes the angle of emission smaller than the angle of incidence by refracting the incident light with respect to the direction of the Z-axis. The second optical prism 23 which is driven by the second actuator 24 is preferably a right-angled triangular prism formed to have a slanted emission surface 23a so as to alter the width of the passing image in the Z-axis direction. The second actuator 24 which is preferably a linear stepping motor receives the signal sensed by the sensor (not shown) and linearly transfers the second optical prism 23.

As mentioned above, in the jitter control apparatus for a video camera according to the present invention, it is possible to control the angle of emission of the image with respect to the directions of the Y- and Z-axes by changing the thickness of the optical member of the area through which the image passes by driving the first and second optical prisms 21 and 23 in the Y- and Z-axes directions.

Figure 4A:
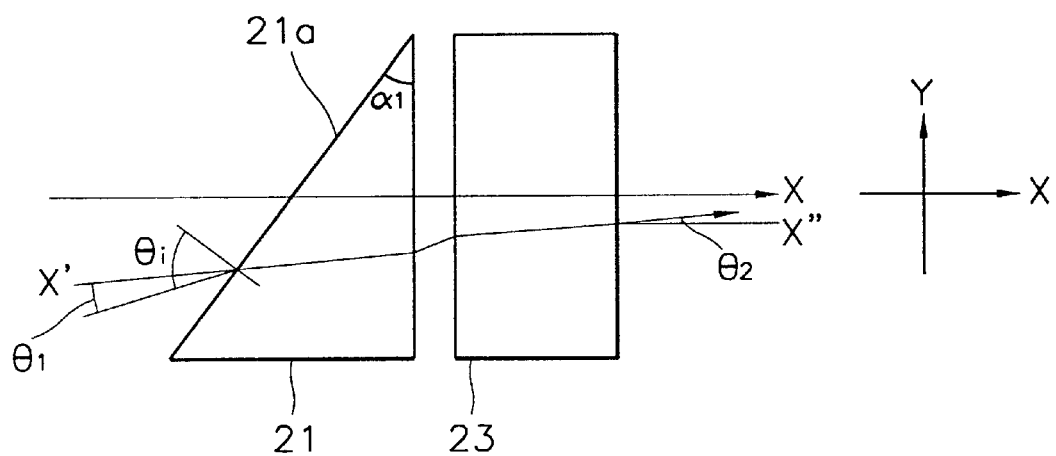
FIG. 4A is a sectional view of the first and second optical prisms of FIG. 2 viewed from the Z-axis direction.

The relationship of the angle of emission with respect to the angle of incidence of light will be described with reference to FIGS. 4A and 4B. FIG. 4A is a sectional view of the first and second optical prisms according to the embodiment of the present invention viewed along the Z-axis. Light incident at an angle $\theta_i$ on the slanted incident surface 21a, whose tilt angle is determined according to the angle $\alpha_1$ of the first optical prism 21, refractively transmits the first and second optical prisms 21 and 23 and is emitted with at an angle of emission $\theta_2$. Here, the angle with respect to the x' axis parallel to the x axis is represented as $\theta_1 = \theta_i - \alpha_1$ and $\theta_1 > \theta_2$ since the refractive index of the first optical prism 21 is larger than that of air.

Figure 4B:
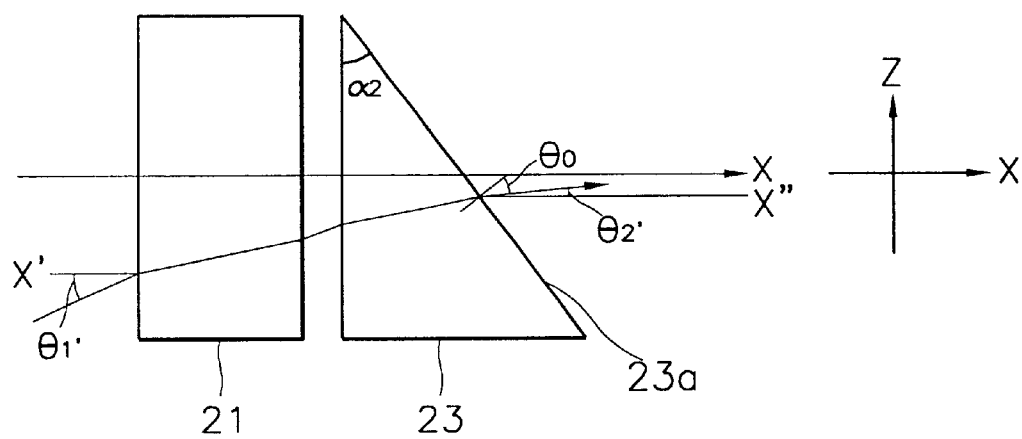
FIG. 4B is a sectional view of the first and second optical prisms of FIG. 2 viewed from the Y-axis direction.

FIG. 4B is a sectional view of the first and second optical prisms according to the embodiment of the present invention viewed along the Y axis. Light incident on the first optical prism 21 at an angle of $\theta_1'$ with respect to x' parallel to the optical axis x is emitted with an angle of $\theta_0$ with respect to a slanted emission surface 23a of the second optical prism 23 whose tilt angle is determined according to the angle $\alpha_2$. Here, the angle with respect to the x" axis parallel to the x axis is represented as $\theta_2' = \alpha_2 - \theta_0$ and $\theta_1' > \theta_2'$ since the refractive index of the second optical prism 23 is larger than that of air.

Therefore, it is possible to prevent jitter of an image by shaking of the hands by re-controlling the focus of the image formed on the screen by determining the positions of the first and second optical prisms by driving the first and second actuators according to the degree of jitter of the image. Also, since a bellows and a transparent liquid injected inside of the bellows are not necessary, it is possible to prevent the apparatus from being contaminated by leakage of the transparent liquid.

What is claimed is:

1. A jitter control apparatus, comprising:

a first optical prism installed to be rectilinearly transferable in a right-angled direction with respect to an optical axis for refracting and transmitting incident light so that the angle of emission is smaller than the angle of incidence with respect to the transfer direction;

a first actuator for rectilinearly transferring said first optical prism;

a second optical prism installed to be adjacent to said first optical prism and rectilinearly transferred in a right-angled direction with respect to the direction in which said first optical prism is transferred for refracting and transmitting the incident light so that the angle of emission is smaller than the angle of incidence with respect to the direction in which said second optical prism is transferred; and a second actuator for rectilinearly transferring said second optical prism, wherein an image formed on the photographing screen is prevented from vibrating by appropriately transferring said first and second optical prisms according to the degree of jitter of an incident image.

2. An apparatus as claimed in claim 1, wherein said first optical prism is a right-angled triangular prism formed to have a slanted surface of incidence so as to alter the width of the image passing therethrough by being transferred by said first actuator.

3. An apparatus as claimed in claim 1, wherein said second optical prism is a right-angled prism formed to have a slanted surface of emission so as to alter the width of the image passing therethrough by being transferred by said second actuator.

* * * * *